(12) United States Patent  
Kung et al.

(10) Patent No.: US 8,983,914 B2  
(45) Date of Patent: Mar. 17, 2015

(54) EVALUATING A TRUST VALUE OF A DATA REPORT FROM A DATA PROCESSING TOOL

(75) Inventors: David Kung, Cupertino, CA (US); Marc Maillart, Paris (FR); Suryanarayana Mangipudi, San Ramon, CA (US); Aun-Khuan Tan, Sunnyvale, CA (US)

(73) Assignee: Business Objects Software Ltd., Dublin (IE)

( * ) Notice: Subject to any disclaimer, the term of this patent is extended or adjusted under 35 U.S.C. 154(b) by 330 days.

(21) Appl. No.: 13/239,406

(22) Filed: Sep. 22, 2011

(65) Prior Publication Data

US 2013/0080197 A1      Mar. 28, 2013

(51) Int. Cl.
*G06F 17/30* (2006.01)
*G06Q 10/10* (2012.01)

(52) U.S. Cl.
CPC ..................................... *G06Q 10/10* (2013.01)
USPC .......................................................... 707/687

(58) Field of Classification Search
CPC .................... G06F 17/30303; G06F 17/30371
USPC .......................................................... 707/687
See application file for complete search history.

(56) References Cited

U.S. PATENT DOCUMENTS

| | | | |
|---|---|---|---|
| 2006/0080195 A1 | 4/2006 | Karabulut | |
| 2007/0106577 A1* | 5/2007 | Kopp et al. | ..................... 705/35 |
| 2007/0294480 A1 | 12/2007 | Moser | |
| 2009/0222399 A1 | 9/2009 | Gomez et al. | |
| 2009/0228629 A1 | 9/2009 | Gebhart et al. | |
| 2009/0282045 A1 | 11/2009 | Hsieh et al. | |
| 2010/0106560 A1* | 4/2010 | Li et al. | ........................... 705/10 |
| 2012/0330911 A1* | 12/2012 | Gruenheid et al. | ........... 707/694 |

OTHER PUBLICATIONS

Dai et al. ("An Approach to Evaluate Data Trustworthiness Based on Data Provenance"), 2008, Springer-Verlag Berlin Heidelberg, pp. 82-98.*

* cited by examiner

*Primary Examiner* — Rehana Perveen
*Assistant Examiner* — Alexander Khong

(57) ABSTRACT

Various embodiments of systems and methods for evaluating a trust value for a report are disclosed herein. The method includes obtaining one or more reports by the computer, where the reports are formed of one or more fields of data. An end-to-end lineage for the data is determined to trace the data back to the data source system from which the data had originated initially. Further, the method includes validating each of the multiple data source systems including intermediate tables, and determining a data quality score for each of the multiple data source systems. A trust value for the report is calculated based on the data quality scores for the one or more data source systems and intermediate tables, and rendered along with the report.

18 Claims, 6 Drawing Sheets

EVALUATING A TRUST VALUE OF A DATA REPORT FROM A DATA PROCESSING TOOL

FIELD

The field relates generally to information processing tools. More specifically, the field relates to evaluating a trust value of a report generated by an information processing tool.

BACKGROUND

Business Intelligence (BI) generally refers to software tools used to improve business enterprise decision making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and, data management systems, such as relational databases or On Line Analytic Processing (OLAP) systems used to collect, store, and manage raw data.

There are a number of commercially available products to produce reports from stored data. As used herein, the term report refers to information automatically retrieved, in response to computer executable instructions, from a data source such as a database, a data warehouse, or a datamart, where the information is structured in accordance with a report schema that specifies the form in which the information should be presented.

Data commonly manifested in reports, is critical to establishing business strategies and actions. Enterprises increasingly integrate data from a number of sources such as different databases, external streaming data feeds, and personal spreadsheets. Once this data is integrated it is difficult to determine which values in a report come from which source. In addition, it is not clear how fresh the data may be or if there are validity issues with the data source. For these reasons, the value of the report is questioned due to concerns regarding the accuracy of the underlying data.

Although, validation of data within a data warehouse may add some degree of confidence in the report, establishing trust in a report document merely based on the accuracy of data within the data warehouse may not provide a reliable measure of confidence in the report. Moreover, currently available enterprise reporting systems do not effectively link such validation information with the report.

SUMMARY

Various embodiments of systems and methods for evaluating a trust value of a data report from a data processing tool are described herein. The method for evaluating a trust value for a report involves obtaining one or more reports from a business intelligence tool. Each of one or more reports is composed of one or more related fields. A field contains an item of data; that is, a character, or group of characters that are related. For instance, a grouping of related text characters such as "Mark Twain" makes up a name in the name field. Further, the method includes determining an end-to-end lineage for the data to trace the data back to the data source system from which the data had originated initially. Each of the multiple data source systems including intermediate tables are validated using a set of validation rules, and a data quality score for each of the multiple data source systems is determined. Further, the method includes calculating a trust value for the report based on the data quality scores for the one or more data source systems and intermediate tables. The trust value for the report may be rendered along with the report as a numerical value, or any form of audio, or visual, or audio-visual representation. The trust value provides an indication of the trustworthiness of the report in terms of accuracy and quality of data in the report.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like reference numerals indicate similar elements. The embodiments of the invention, together with its advantages, may be best understood from the following detailed description taken in conjunction with the accompanying drawings.

DETAILED DESCRIPTION

Embodiments of techniques for evaluating a trust value of a data report from a data processing tool are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
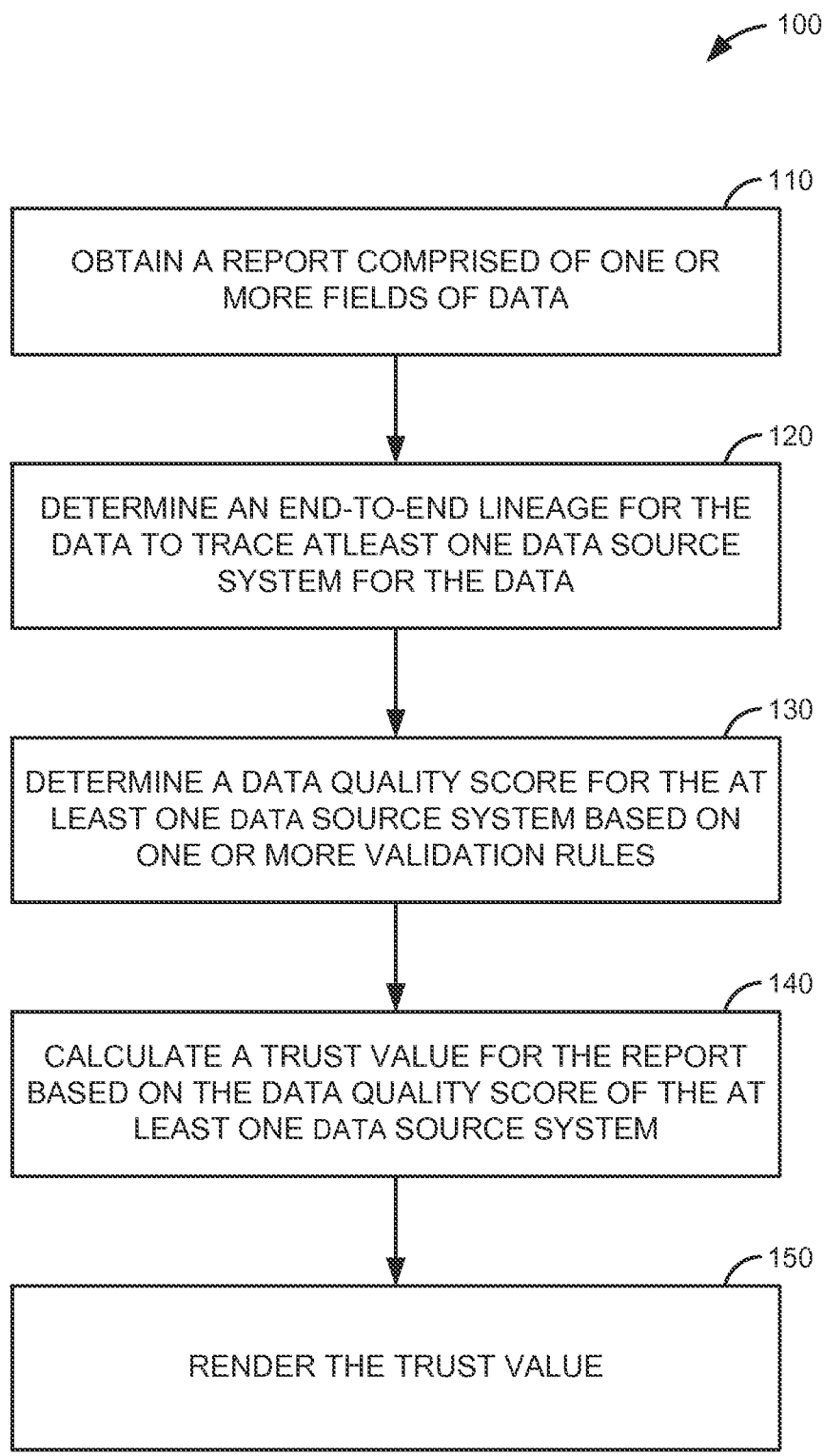
FIG. 1 is a flow diagram of a method for evaluating a trust value for a report, according to one embodiment.

FIG. 1 illustrates a flow diagram of a method 100 for evaluating a trust value for a report, according to one embodiment. The method includes obtaining (110) one or more reports by a computer. The one or more reports are composed of a group of related fields of data. For example, a payroll report may contain the name, address, social security number, and title of each employee as fields in the report. The reports may be received by the computer from a Business Intelligence (BI) tool or any other computer on the network. The BI tool comprises a set of executable instructions for retrieving, analyzing and reporting data as useful information. In another example, the reports may be created at the computer using data from a data repository. The data repository may be a data warehouse having a repository of data collected from one or more data source systems. For example, data in the data warehouse may be collected from data source systems such as databases, external feeds, data ware houses, datamarts, etc. Further, the method includes selecting a report from the one or more reports and viewing an end-to-end lineage for the data in the report. In an example, the end-to-end lineage for the data in the report can be viewed by selecting a "view lineage" option provided on a user interface for the report. According to an embodiment, an end-to-end lineage for the data is determined (120) by tracing the data back to the data source system from which the data had originated initially. For example, a report obtained at the computer may contain one or more tables of data, where each table is comprised of one or more fields of data. The fields may be characterized as row/column in the table and each field may contain one or more data elements such as a string of characters, numerals, alphabets, or any combination. As mentioned previously, the data from the source data system may be subject to several intermediate transformations and integrations prior to being populated in the report. Also, the data in the report may be obtained from multiple disparate data sources each having varying degrees of reliability. In order to assess the reliability of the report in terms of the accuracy and trustworthiness, the method includes validating each of the multiple data source systems including intermediate tables, and determining (130) a data quality score for each of the multiple data source systems. The data quality score for a data source system is generated by applying one or more validation rules to the data in the data source system. For example, in order to validate a field of data for Social Security Number, a validation rule such as "$SSN is NOT NULL," AND "$SSN has pattern '*--***'" may be applied.

Further, the method includes calculating (140) a trust value for the report based on the data quality scores for the one or more data source systems and intermediate tables if any. The trust value provides an indication of the trustworthiness of the report in terms of accuracy and quality of data in the report. In an embodiment, the trust value is calculated by calculating an aggregate score of the data quality scores for each of the one or more data source systems. The aggregate scores can be calculated by any method including but not limited to weighted average, minimum value, and maximum value. The trust value for the report may be rendered (150) on the computer as a numeric score, or any form of audio, or visual, or audio-visual representation. For example, the trust value can be represented as a color code, where "red" represents low reliability, "green" represents high reliability, and "orange" represents moderate reliability.

Figure 2:
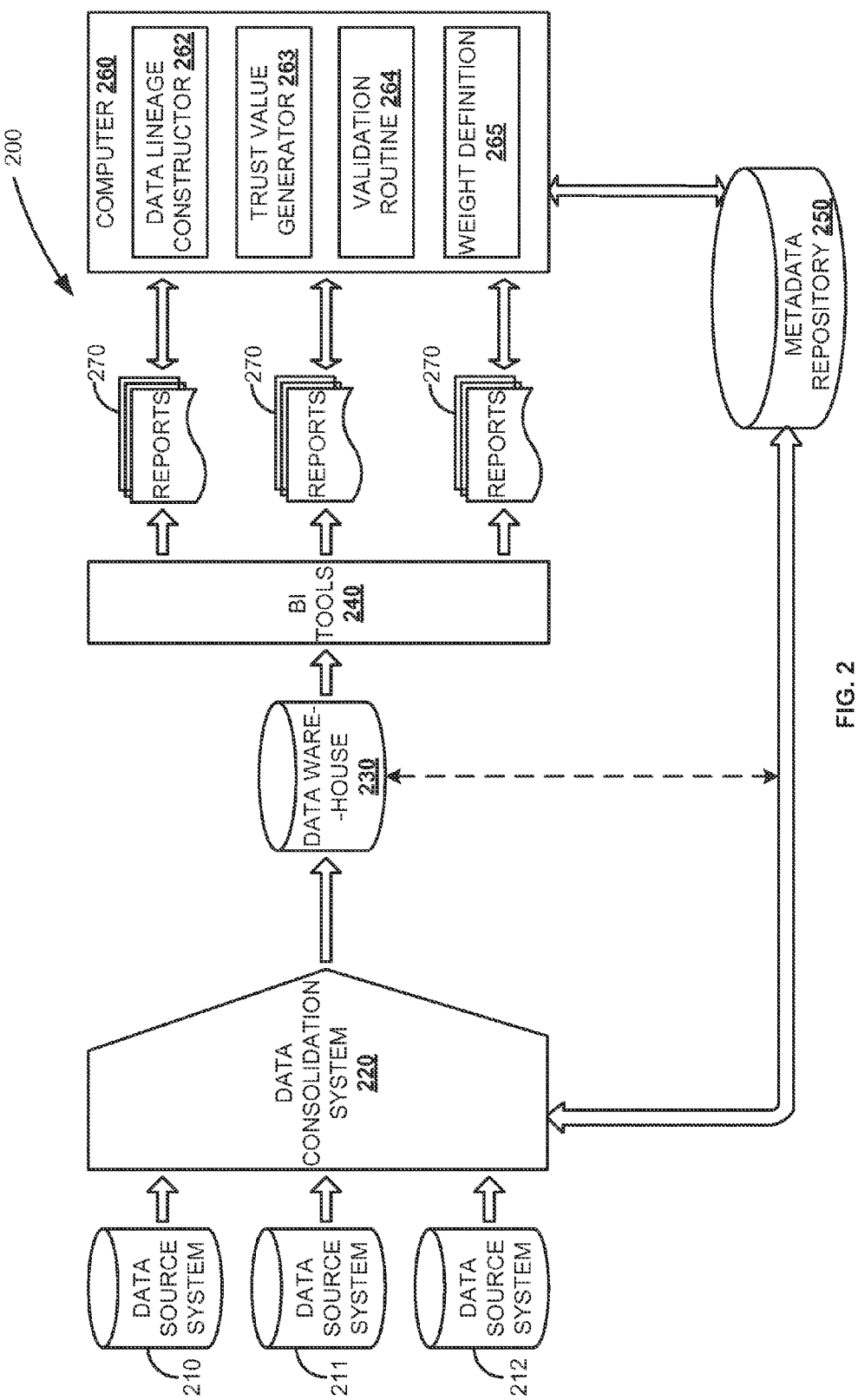
FIG. 2 illustrates a block diagram of an exemplary system for evaluating a trust value for a report configured in accordance with an embodiment.

FIG. 2 illustrates a system 200 configured to perform the method described with reference to FIG. 1, in accordance with an embodiment of the invention. The system 200 includes a set of data source systems 210, 211, and 212, data consolidation system 220, data warehouse 230, Business Intelligence (BI) tools 240, a metadata repository 250, and a computer 260 operating in a data communication network. A data source system 210, 211, or 212 is an information resource. Data source systems 210, 211, and 212 include sources of data that enable data storage and retrieval. Data source systems 210, 211, and 212 may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files), hierarchical data (e.g., data in a file system, XML data), files, a plurality of reports 270, and any other data sources accessible through an established protocol, such as, Open DataBase Connectivity (ODBC), produced by an underlying software system (e.g., ERP system), and the like. Data source systems 210, 211, and 212 may also include a data source where the data is not tangibly stored or otherwise ephemeral such as data streams, broadcast data, and the like. These data source systems 210, 211, and 212 can include associated data foundations, semantic layers, management systems, security systems and so on.

By way of example, the data source systems 210, 211, and 212 may include databases, external feeds, data ware houses, datamarts, modeling tools, ETL tools, Business Intelligence (BI) tools, and the like. Data consolidation systems 120 such as ETL, EAI, and ELT coordinate the retrieval and delivery of metadata from the disparate data source systems 210, 211, and 212 to the metadata repository 250. Also, the data in the data source systems 210, 211, and 212 are subject to data transformation and integration through the data consolidation system 220 and loaded into the data warehouse 230. The data in the data warehouse 230 may be accessed by Business intelligence (BI) tools 240 to create and supply one or more reports 270. The BI tools 240 include executable instructions required to turn the data into information such as standard reports, queries, analytical applications, OLAP analysis, exception based reporting, data mining etc. The one or more reports 270 may be rendered on the computer 260 in the network.

The computer 260 includes a computer readable storage medium (CRSM) having executable instructions or code stored therein to perform the above-illustrated methods. For example, the CRSM includes a data lineage constructor 262, a trust value generator 263, validation routine 264 and weight definition 265 comprising executable instructions to coordinate the processing of the information in the reports 270, data warehouse 230, and the metadata repository 250.

The data lineage constructor 262 includes executable instructions to identify relationships between objects in a report 270 with respect to multiple data source systems 210, 211, and 212, particularly, original data source systems. As used herein, the term "object" refers to data elements within a record of the report 270 and the term "original" data source system refers to the data source system 210 from which the data initially originated prior to being subject to transformations and integrations in intermediate tables. Based on the instructions from the data lineage constructor, a processor associated with the computer executes a set of relationship rules to identify and characterize the impact and lineage of objects in the report 270 using the metadata stored in the metadata repository 250.

Further, based on the lineage information provided by the data lineage constructor, the processor calculates data quality scores for the multiple data source systems. A data quality score is obtained by applying a data validation rule to a field (row/column) of a record in a data source system 210. For example, the data quality score may indicate a degree of accuracy of data, where higher the data quality score, better the accuracy of data in the record. The data quality score may be stored in the metadata repository or the data warehouse 230 along with the data. In an embodiment, the data quality scores, in the form of metadata, are directed to the metadata repository 250. The data quality scores may be downloaded from the metadata repository 250 for processing by the trust value generator 263.

The trust value generator 263 includes executable instructions for generating trust values using data quality scores retrieved from the metadata repository 250. The trust value may be associated with a report 270 to ascribe a level of trustworthiness to a report 270. The trust value provides an indication of the trustworthiness of the report in terms of accuracy and quality of data in the report. The trust value generator 263 generates the trust value by aggregating the data quality scores. In an embodiment, the combination of data quality score is a weighted average, where the weights associated with the data quality scores are configurable. In an embodiment, the combination is by extreme value of data quality score, that is minimum or maximum value.

According to an aspect, when a report 270 is generated or received at the computer 260, the data lineage constructor 262 within the CRSM determines an end-to-end lineage of the report 270. The end-to-end lineage of the report 270 is determined by tracking the lineage of the data in each field of the report 270 back to an original data source system 210, 211, and/or 212 including any intermediate tables. The lineage of the data may be determined using metadata information from the metadata repository 250. As mentioned already, the data consolidation system 220 coordinates the retrieval and delivery of metadata from the disparate data source systems 210, 211, and 212 to the metadata repository 250. Also, the metadata information of the source data that are subject to data transformation and integration through the data consolidation system 220 is loaded into the metadata repository 250. By using the metadata information stored in the metadata repository 250, the data lineage constructor 262 constructs an end-to-end lineage of the data.

For example, the lineage of the data can be represented by a line diagram or flow diagram with the data in the report 270 as the starting point in the flow, and tracing back to the source of origin of the data. The flow diagram may also show any intermediate tables where the data has been subject to transformation, integration, or any other processing. In an embodiment, the lineage constructor 262 may associate a data quality score with each of the intermediate and source tables in the data flow. As mentioned above, the data quality score may be generated throughout the network at various points by applying validation routines 264. In addition, the lineage constructor 262 may be configured to display additional metadata characteristics such as value distribution, transformations, integrations, maximum value, minimum value, pattern, length of field, blanks, how populated the field is, etc.

In an alternative embodiment, subsequent to determining the lineage of the data, the data quality scores for the identified original data source(s) is retrieved from the metadata repository 250. It is herein assumed that a set of validation rules have already been applied to the data source systems 210, 211, and 212 and the data quality scores have been stored in the metadata repository 250.

Further, the trust value generator 263 processes the data quality scores to generate a trust value for the report 270. For example, the trust value generator 263 may assign weights to each of the data quality scores, according to weight definition 265 (FIG. 2) and then determine an aggregate of the data quality scores to produce a trust value. The trust value indicates a level of trustworthiness for the report 270.

In addition, the report 270 may include information on the individual data quality scores. The composition and weighting of the individual data quality scores is configurable. In addition, the weighting of components forming an individual data quality score is configurable. For example, more weight may be ascribed to trust categories that represent valued trust criteria for a given organization. That is, an organization can customize trust indicators within a system to reflect an organization's internal values, priorities, weightings, and thresholds with respect to trusting data.

Figure 3:
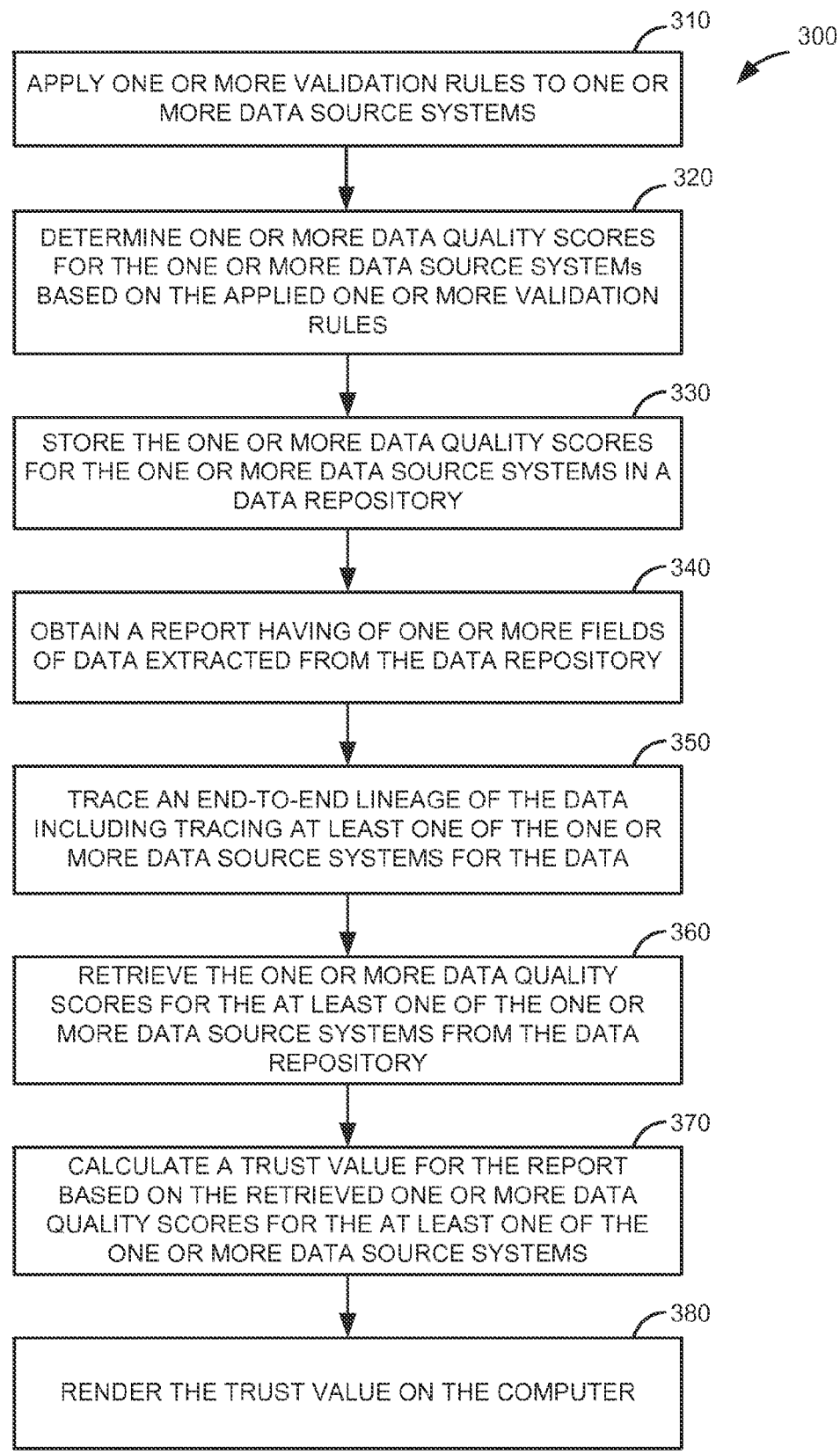
FIG. 3 is a flow diagram of a method for evaluating a trust value for a report, according to another embodiment.

FIG. 3 illustrates a flow diagram of a computer-implemented method 300 for evaluating a trust value for a report 270, according to another embodiment. The method includes applying (310) one or more validations rules to one or more data source systems 210, 211, and 212 and determining (320) a data quality score for each of the data source system 210, 211, or 212 based on the one or more validation rules. The data quality score is then stored (330) in a data repository such as a metadata repository 250 or a data warehouse 230. The method further includes, obtaining (340) a report 270 having one or more fields of data, where the data is extracted from the data repository. An end-to-end lineage of the data in the report 270 is determined in order to trace (350) the data back to one or more data source systems 210, 211, and 212. Further, the data quality score for the data source system 210, 211, and/or 212 is retrieved (360) from the data repository and a trust value for the report 270 is calculated (370) based on the retrieved one or more data quality scores. The trust value is then rendered (380) on the computer along with the report 270.

Figure 4:
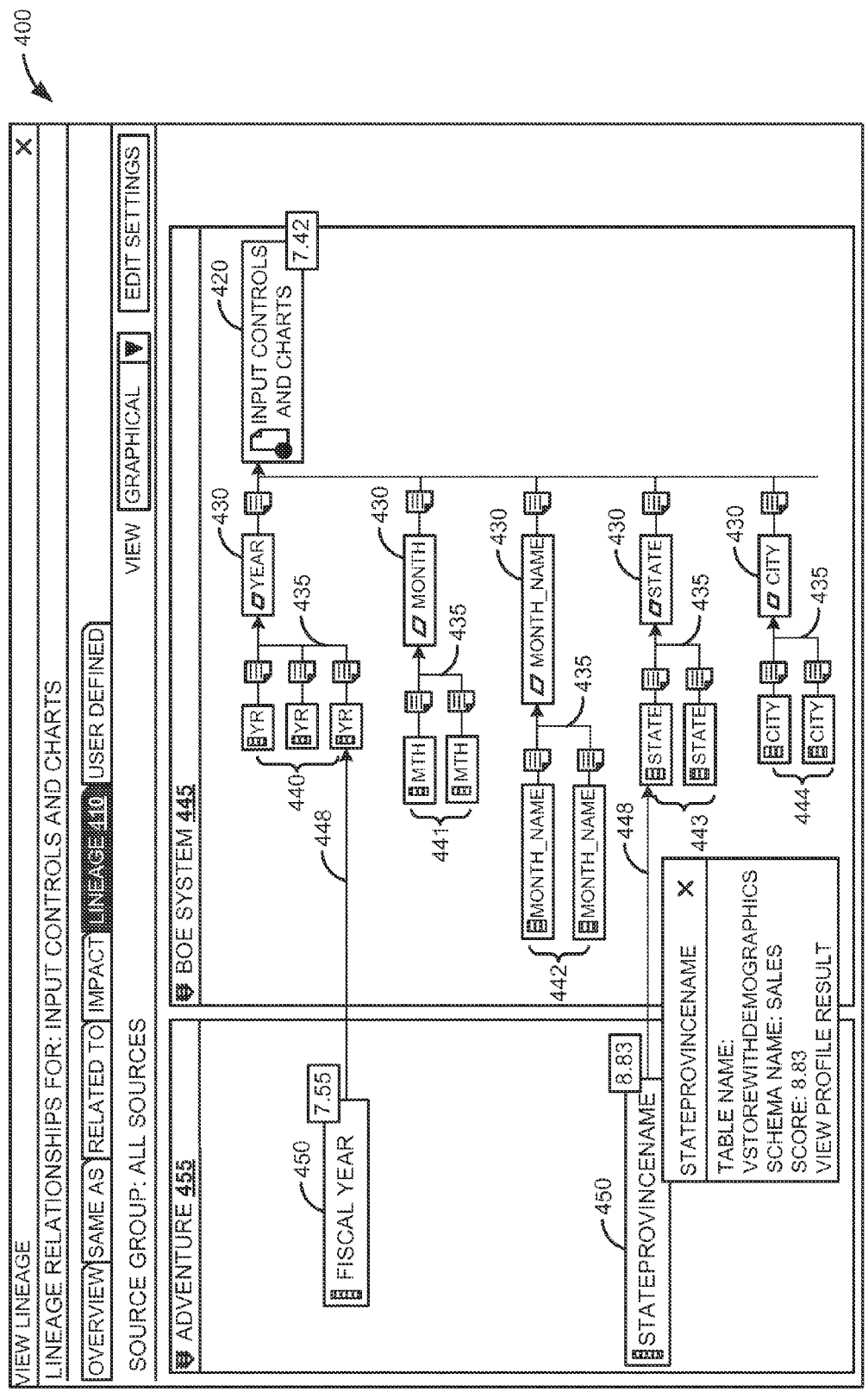
FIG. 4 illustrates a graphical user interface displaying a lineage of data in accordance with an embodiment.

FIG. 4 illustrates an exemplary graphical user interface 400 showing a graphical representation of lineage of data in a report. In the given example, the lineage for the report is illustrated as a flow diagram on a graphical user interface 400 of the computer 260. The lineage flow diagram includes block 420 representing an "Input Controls and Charts (ICC)" report, blocks 430 representing fields comprised in the report 420, blocks 440-444 representing columns in the reporting system, e.g., a SAP® BusinessObjects™ Business Intelligence Platform (formerly called Business Objects Enterprise, BOE) system 445, and Blocks 450 representing columns in tables of a data source system, e.g., Adventure 450. Further, the multiple lines 425, 435, and 448 connecting the various blocks represent an association between the connected blocks. As shown in the example, lines 435 connecting each of the fields 430 to columns 440, 441, 442, 443, and 444 denotes that one or more data elements in the fields "year," "month," "month name," "state," and "city" are respectively extracted from the columns "yr," "mth," "month_name," "state," and "city" in the reporting system 445. The columns 440, 441, 442, 443, and 444 in the reporting system may in-turn be built from one or more columns 450 in the data source system 455 from which the data originates, as denoted by connecting lines 448. For example, the column 443 in the reporting system 445 labeled "state" is shown to be connected by line 448 to a column 450 "StateProvinceName" of a Table "vStorewithDemographics" indicating that one or more data elements in the column "state" 443 is extracted from the column "StateProvinceName" 450 in the Table "vStoreWithDemographics" of the data source system 455 that provides State/Province name. Similarly, the column 440 in the reporting system 445 labeled "Yr" is shown to be connected by line 448 to a column "FiscalYear" 450 of Table "Historical cost" indicating that one or more data elements in the column "Yr" 440 is extracted from the column "FiscalYear" 450 in the Table "Historical cost" of the data source system 455. Also, a data quality score that is calculated for each of the columns 450 in the data source system 455 and the reporting system 445 are respectively associated with various blocks in the lineage flow. As shown in the example, a data quality score of 8.83 is displayed along with the "vStoreWithDemographics"

table. Also, the column "StateProvinceName" 450 can be selected to provide an expanded view displaying additional information such as Table name, Schema name, quick link for a profile result, etc. Further, additional metadata information may be displayed along with the data quality score at each step of the process. For example, metadata information such as profiling information, transformations, integrations, pattern, length of field, blanks, etc., may be displayed at each step in the lineage flow. The process of generating the data quality score and the calculation of a trust value for the report will be described with reference to FIG. 4.

Figure 5:
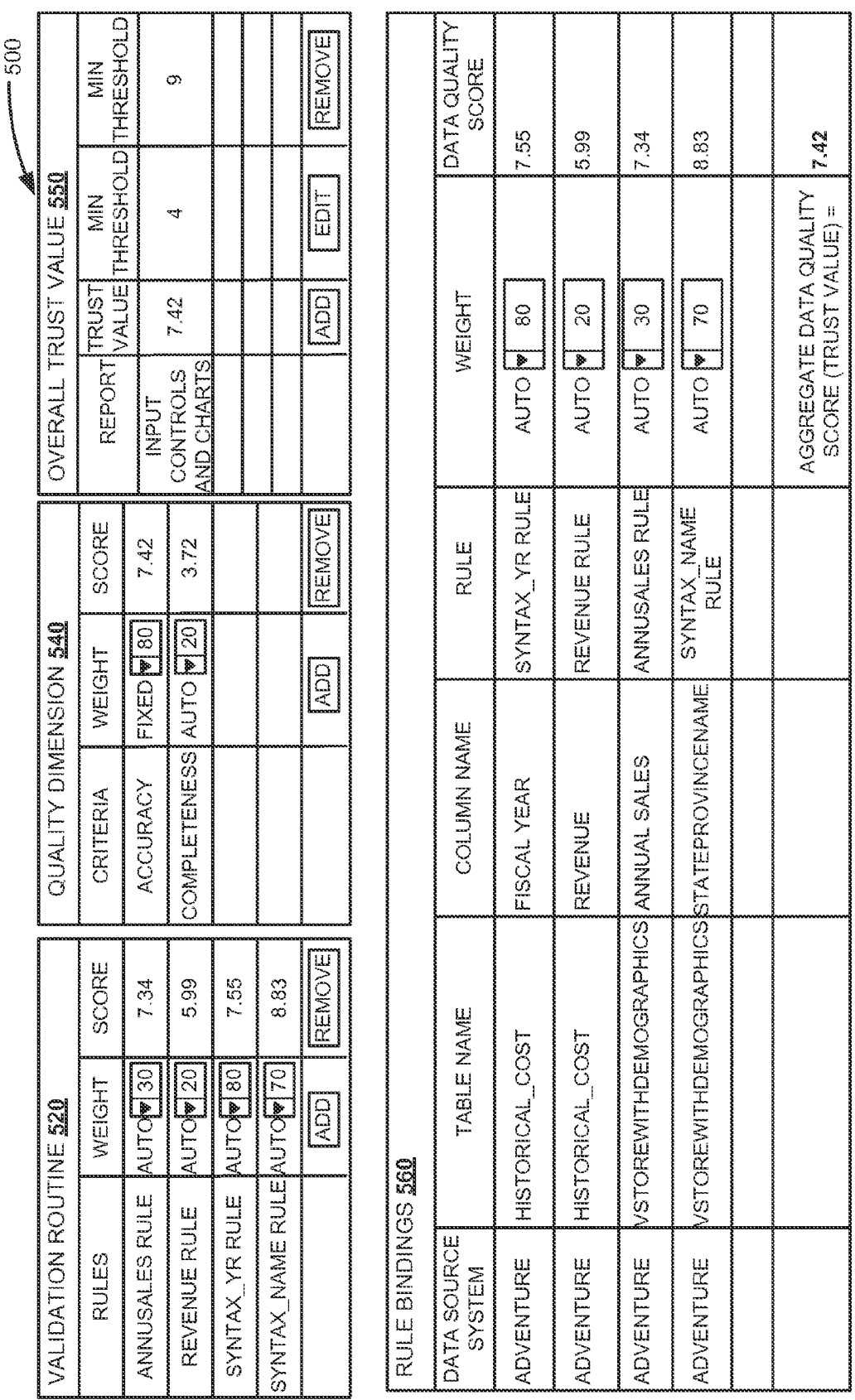
FIG. 5 illustrates a graphical user interface depicting the elements involved in deriving an overall trust value for a report in accordance with an embodiment.

FIG. 5 illustrates a graphical user interface 500 depicting the components involved in deriving an overall trust value for a report, as calculated in accordance with an embodiment. The overall trust value may be represented as a numerical indicator, a visual indicator, an audio indicator or a combination. In this embodiment, trust value is represented using a numerical indicator on a report rendered on the graphical user interface. FIG. 5 shows how an overall trust value is determined based on the data quality scores of individual tables in the data source system, as described with reference to FIG. 4. Also, the use of the foregoing data quality scores and their respective weightings is described with reference to FIG. 5.

The "Validation routine" table 520 provides the data quality score obtained upon application of the one or more validation rules 530 against the relevant columns 450 in the data source system 455. For example, the score 7.34 is obtained when the "AnnualSales rule" is applied to the "AnnualSales" column 450 in the data source system 455 with a weighting of 30%. Similarly, the data quality scores 5.99-8.83 are generated by applying the corresponding rules to the relevant columns in the data source system 455. Thus, the data quality score is a function of one or more validation rules specified as an externally defined validation rule forming input metadata input. Metadata outputs associated with the data quality score include a success/failure data, success/failure rows, and the number of success/failure rows. In an embodiment, the lineage constructor 262 may be configured to display the data quality score as a minimum column score for a column or may be configured to display the data quality score as the maximum column score for a column. Alternatively, the data quality score may be displayed as the weighted average of the data quality score for a column.

Further, the "Quality dimension" table 540 provides options for quality criteria that may be set by default or be altered by a user. The validation rules may be categorized so as to be associated with at least one of the criteria. For example, selecting the quality criteria "Accuracy" would invoke the validation rules that are configured to check for accuracy of data. For example, a validation rule for determining accuracy may determine whether the data meets a particular syntax such as string_length. Similarly, a validation rule for determining "Completeness" may be configured to determine whether the column has empty cells or not. As illustrated, the data quality score has component weightings of 80% for Accuracy and 20% for completeness. These weightings may be set by default or they may be altered by a user.

The "Overall Trust Value" table 550 provides a numerical score indicating the trust value for a report. In the given example, the "Input Controls and Charts" report 420 has a trust value of 7.42 where a minimum threshold is "4" and a maximum threshold is "9." The threshold limits are used to assess a level of trustworthiness of the report with "4" being a lower cut-off limit and "9" being an upper cut-off limit with respect to a trust value. The trust value of a report may be used to trigger various actions. For example, a user may be alerted to a report refresh operation only in the event that an acceptable trust value is reached. Alternatively, a database administrator may be alerted when a refreshed report fails to achieve a specified trust value. A database administrator may also use trust values to periodically remove untrustworthy reports from a repository.

The "Rule Bindings" table 560 shows the data quality scores for individual columns in the data source system along with the applied validation rule. In the given example, the data quality score of 7.55 is obtained upon application of "syntax_yr rule" on column "Fiscal year" 450 of table "Historical_cost" in the data source system 455. Similarly, the remaining data quality scores are shown to be generated based on application of the relevant rules on the corresponding columns. The trust value is generated by aggregating the individual data quality scores for each of the columns.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
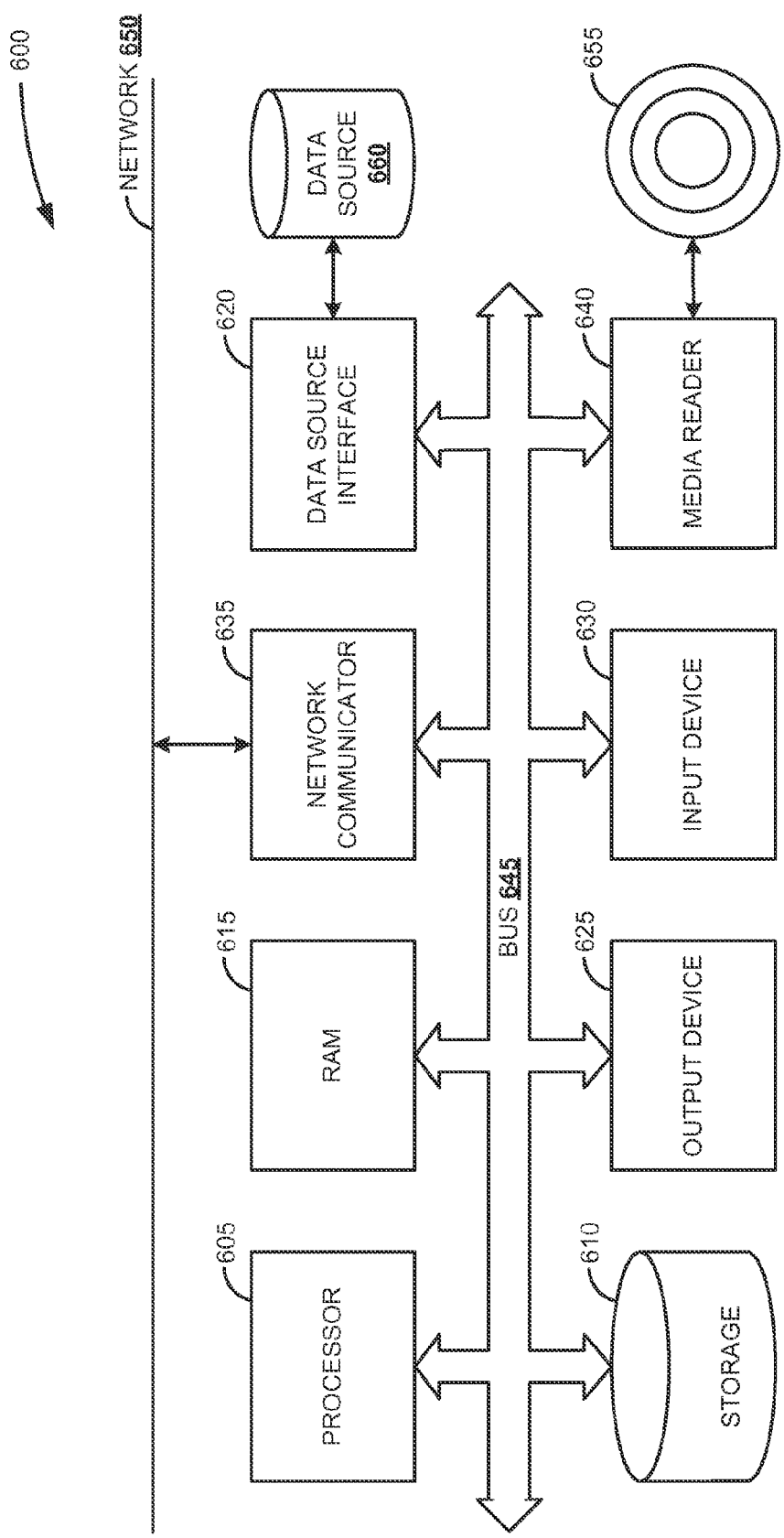
FIG. 6 illustrates a block diagram of an exemplary computer system configured in accordance with an embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer-implemented method, comprising:
    obtaining, at a computer, a report comprises of one or more fields of data;
    determining, by the computer, an end-to-end lineage for the data comprising tracing one or more data source systems and one or more intermediate tables for the data, wherein the data is transformed and integrated in the one or more intermediate tables;
    determining, by the computer, a data quality score for the one or more data source systems and the one or more intermediate tables based on one or more validation rules;
    calculating, by the computer, a trust value for the report based on the data quality score for the one or more data source systems and the one or more intermediate tables;
    assessing, by the computer, a level of trustworthiness of the report based on a minimum threshold as a lower limit with respect to the trust value and a maximum threshold as an upper limit with respect to the trust value; and
    rendering the trust value on a user interface associated with the computer, when the trust value lies between the minimum threshold and the maximum threshold.

2. The method of claim 1, wherein the report is created using a data repository, wherein the data repository comprises a repository of data collected from the one or more data source systems.

3. The method of claim 1, wherein determining the data quality score for the one or more data source systems comprises applying at least one of the one or more validation rules to one or more fields of the one or more data source systems and evaluating the data quality score based on the compliance of the one or more fields with the at least one of the one or more validation rules.

4. The method of claim 3, wherein calculating the trust value for the report comprises calculating an aggregate of the data quality score for the one or more data source systems.

5. The method of claim 1, wherein determining the data quality score for the one or more data source systems comprises assigning weights to the one or more validation rules.

6. The method of claim 5, wherein the calculating the trust value for the report comprises calculating a weighted average of the scores for the one or more data source systems.

7. An article of manufacture, comprising:
    a non-transitory computer readable storage medium having instructions which when executed by a computer causes the computer to:

obtain a report comprises of one or more fields of data;

determine an end-to-end lineage for the data comprising tracing one or more data source systems and one or more intermediate tables for the data, wherein the data is transformed and integrated in the one or more intermediate tables;

determine a data quality score for the one or more data source systems and the one or more intermediate tables based on one or more validation rules;

calculate a trust value for the report based on the data quality score for the one or more data source systems and the one or more intermediate tables; and assess a level of trustworthiness of the report based on a minimum threshold as a lower limit with respect to the trust value and a maximum threshold as an upper limit with respect to the trust value.

8. The article of manufacture in claim 7, wherein the computer readable storage medium further comprises instructions, which when executed by the computer causes the computer to:

create the report using a data repository, wherein the data repository comprises a repository of data collected from the one or more data source systems.

9. The article of manufacture in claim 7, wherein the computer readable storage medium further comprises instructions, which when executed by the computer causes the computer to:

determine the data quality score for the one or more source fields of the one or more data source systems by applying at least one of the one or more validation rules on the one or more fields of the one or more data source systems and evaluating the data quality score based on the compliance of the one or more fields with the at least one of the one or more validation rules.

10. The article of manufacture in claim 9, wherein the computer readable storage medium further comprises instructions, which when executed by the computer causes the computer to:

calculate the trust value for the report by calculating an aggregate of the data quality score for each of the one of more fields in the one or more data source systems.

11. The article of manufacture in claim 7, wherein the computer readable storage medium further comprises instructions, which when executed by the computer causes the computer to:

calculate the trust value for the report by calculating a weighed average of the scores for the one of more data source systems.

12. A computer-implemented method, comprising:

applying, by a computer, one more validation rules to one or more data source systems and one or more intermediate tables;

determining, by the computer, a data quality scores for the one or more data source systems and the one or more intermediate tables based on the applied one or more validation rules;

storing, by the computer, the one or more data quality scores for the one or more data source systems and the one or more intermediate tables in a data repository;

obtaining, by the computer, a report having one or more fields of data extracted from the data repository;

tracing by the computer, an end to end lineage of the data including tracing the one or more data source systems and the one or more intermediate tables for the data, wherein the data is transformed and integrated in the one or more intermediate tables;

retrieving, by the computer, the one or more data quality scores for the one or more data source systems and the one or more intermediate tables from the data repository;

calculating, by the computer, a trust value for the report based on the retrieved one of more data quality scores for the one or more data source systems and the one or more intermediate tables; and assessing, by the computer, a level of trustworthiness of the report based on a minimum threshold as a lower limit with respect to the trust value and a maximum threshold as an upper limit with respect to the trust value.

13. The method of claim 12, wherein the end-to-end lineage provides a flow of data from the data source system through one or more intermediate stages to the data repository.

14. The method of claim 12, wherein determining one or more data quality scores for the one or more data source systems comprises determining the data quality score for one or more fields of the one or more data source systems.

15. A system operating in a communication network, comprising:

one or more data source systems and one or more intermediate tables;

a data repository to store data from the one or more data source systems;

a business intelligence tool for generating a report comprising data from the data repository; and a computer comprising a memory to store a program code, and a processor to execute the program code to:

determine an end-to-end lineage for the data in the report comprising tracing one or more data source systems and the one or more intermediate tables for the data, wherein the data is transformed and integrated in the one or more intermediate tables;

determine a data quality score for the one or more data source systems and the one or more intermediate tables for the data based on one or more validation rules;

calculate a trust value for the report based on the data quality score for the one or more data source systems and the one or more intermediate tables; and assess a level of trustworthiness of the report based on a minimum threshold as a lower limit with respect to the trust value and a maximum threshold as an upper limit with respect to the trust value.

16. The system of claim 15, wherein the one or more validation rules include at least one of a max-min value of a field, a max-min length of a field, a character type of a field, a pattern of a field, a distribution of a field, a blank field, and a content of a field.

17. The system of claim 15, wherein the at least one data source system comprises one or more source fields, wherein each of the one or more source fields is transformed into one or more rows and columns in the report.

18. The system of claim 15, wherein the report is composed of a group of related fields of data.

* * * * *